Aug. 10, 1965    E. H. SHORT III    3,199,834
TILTING VALVE WITH FLOATING LINK OPERATOR
Filed July 26, 1962    3 Sheets-Sheet 1
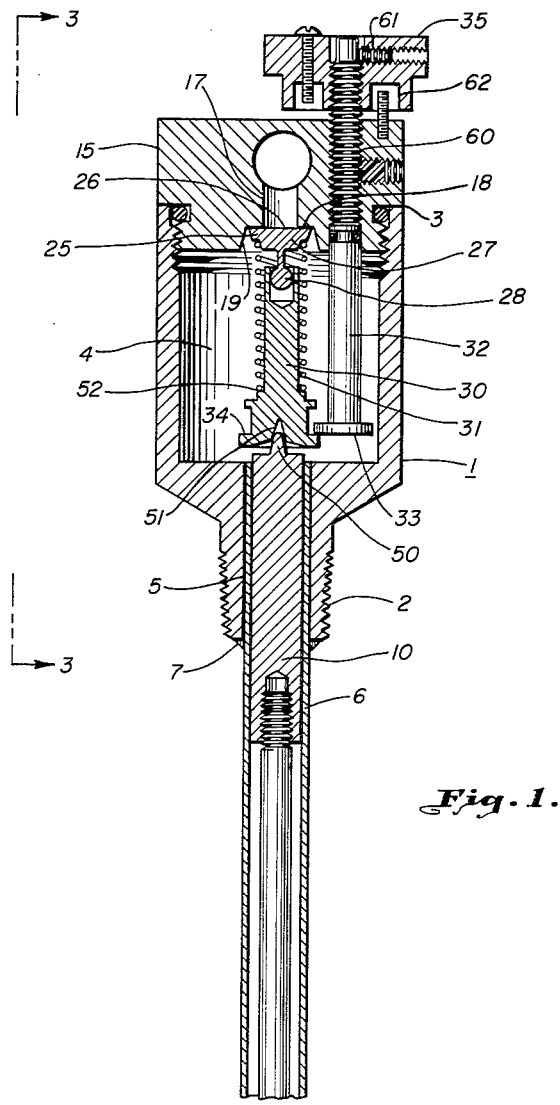
Fig.1.
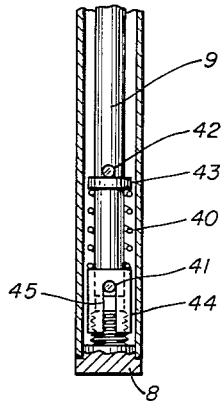
INVENTOR.
EDWARD H. SHORT III
BY
*Arthur L. Wade*
ATTORNEY Aug. 10, 1965 E. H. SHORT III 3,199,834
TILTING VALVE WITH FLOATING LINK OPERATOR
Filed July 26, 1962 3 Sheets-Sheet 2
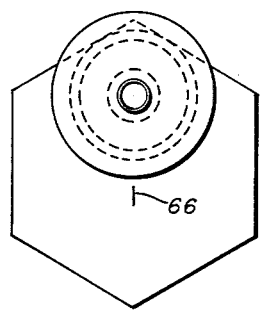
Fig. 4.
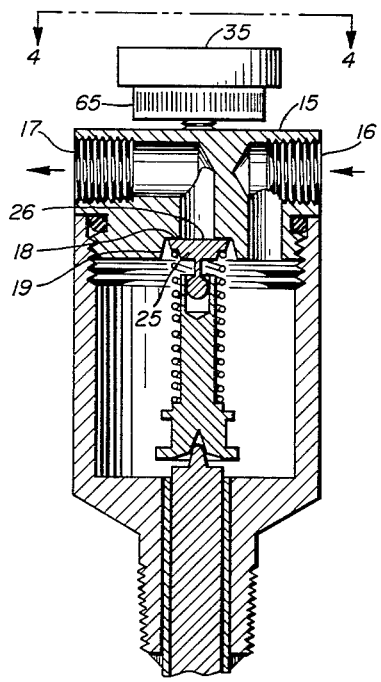
Fig. 3.
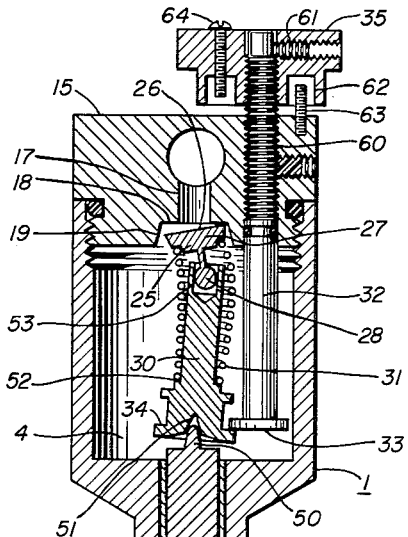
Fig. 2.
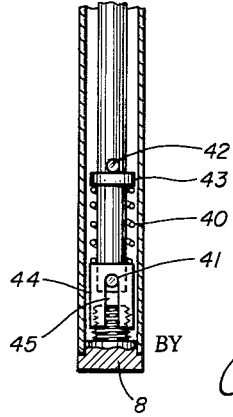
INVENTOR.
EDWARD H. SHORT III
BY *Arthur L Wade*
ATTORNEY Aug. 10, 1965 E. H. SHORT III 3,199,834
TILTING VALVE WITH FLOATING LINK OPERATOR
Filed July 26, 1962 3 Sheets-Sheet 3

INVENTOR.
EDWARD H. SHORT III

BY
ATTORNEY

United States Patent Office 3,199,834
Patented Aug. 10, 1965

3,199,834
TILTING VALVE WITH FLOATING LINK
OPERATOR
Edward H. Short III, Tulsa, Okla., assignor to National
Tank Company, Tulsa, Okla., a corporation of Nevada
Filed July 26, 1962, Ser. No. 212,512
10 Claims. (Cl. 251—228)

The present invention relates to control mechanisms which modify a fluid flow by a valve in accordance with the variable demand for the fluid. More particularly, the invention relates to valving a pilot fluid to regulate a fuel to a combustion process, or valving the fuel directly, as the demand for the heat of the combustion changes.

There is a problem in exposing a primary element to a temperature condition and amplifying the small dimensional changes of the primary element over a selected temperature range to develop effective control action. There have been many valve and linkage arrangements developed for this purpose. The present invention is aimed at the problem of developing both a valve and linkage between the valve and primary element which can be turned out on a lathe or screw machine without critical tolerances and yet be readily assembled into a unit which is easily calibrated, sensitive, accurate and consistent.

The primary object of this invention is to valve a fluid with the movement of an object, the object moving in accordance with a variable to be controlled and the fluid valved exerting a control over the variable.

Another object is to provide a valve and linkage between a variably positioned object and the valve which can be readily reproduced on a lathe or screw machine.

Another object is to form the components of the linkage and position them relative to each other so the effect of ambient temperature variations will be greatly reduced in this type of device.

The invention contemplates forming a valve and actuating linkage member for the valve by a lathe or screw machine so that rotation of the valve or the actuating linkage member will not change the operative relation between the parts. The valve, in its closed position, on its seat is axially aligned with the actuating member of the linkage. The value has a circular base. The actuating member is moved axially until a pivot point is engaged, the pivot being on a line parallel with the axis of the actuating member and valve when they are aligned. The valve and member are then misaligned by pivoting the linkage member from the pivot point which is on the line parallel with the axis of the actuating member and valve when they are aligned and a transverse distance from the axis of alignment. The valve is tipped on the circular edge of its base, varying the restriction of the opening through its seat. The pivot point of the linkage member is adjusted by moving it parallel to the axis of alignment.

The invention also contemplates establishing the active length of the primary element substantially completely within the temperature condition sensed and controlled. The relatively movable parts of the apparatus exposed to ambient conditions are of the same material, or of different materials having substantially the same coefficient of expansion. Moving together, these parts do not change the valve position with respect to its seat opening as the ambient temperature varies. The unit is, therefore, compensated for ambient temperature change in a basic manner not provided in prior art devices of this type.

Other objects, advantages and features of this invention will become apparent to one skilled in the art upon consideration of the written specification, appended claims, and attached drawings, wherein;

FIG. 1 is a sectioned elevation of a complete temperature control unit embodying my present invention;

FIG. 2 is the unit of FIG. 1 with the parts in another position of operation;

FIG. 3 is a view of a part of FIG. 1 along the lines 3—3;

FIG. 4 is a view of the device of FIG. 3 along the lines 4—4;

GENERAL ARRANGEMENT

Figure 5:
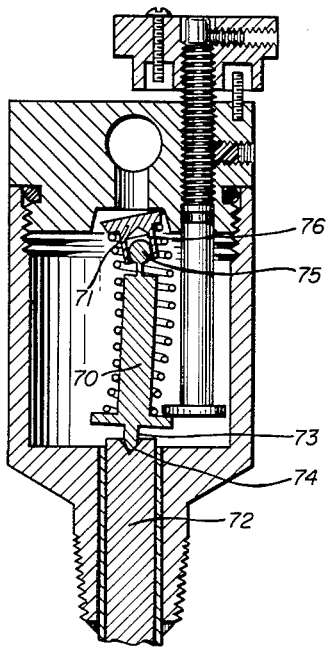
FIG. 5 is a sectioned elevation of the control head of a unit similar to the unit of FIGS. 1-4 but with a different form of valve linkage.

In FIG. 1 I have shown the preferred embodiment of my invention in a sectioned elevation. The more complete instrument embodying my invention is mounted in a location where the temperature of a volume can be sensed. Within this instrument is the more specific valve mechanism with which my invention is disclosed.

It is the housing 1 for the valve mechanism around which I orient the disclosure. This housing 1 is cylindrical in form, one end necked down to threads with which the entire unit is adapted to be mounted in a vessel in which the temperature condition is sensed. The opposite end 3 is open to receive the valve elements within axial bore 4.

The necked down portion, with external mounting threads 2 has an axial bore 5 in which the active, primary element of the temperature sensitive element is mounted. Casing 6 is a simple cylinder in form, welded to housing 1 at 7 and elongated to extend into the temperature condition sensed. The outer end of casing 6 is closed with an end plug 8.

End plug 8 is fixed to the outer end of casing 6 and is attached to the outer end of rod 9. Rod 9 extends axially up into the bore of casing 6 and attaches to ambient compensating link 10. Link 10 is essentially a plunger fitting within casing 6, attached to rod 9 by its inner end and extending its outer end from casing 6 and into housing 1. As casing 6 elongates and contracts with temperature variations in the vessel, rod 9 and link 10 are moved to actuate the linkage within housing 1.

The purpose of moving link 10 by temperature variation is to actuate a valve controlling fluid which, in turn, controls the temperature variation. This valve is located on its seat in control head 15.

Control head 15 is sized and threaded to couple to the open end 3 of housing 1. Control head 15 is a generally cylindrical body, threaded to couple to housing 1 and is drilled to provide a passage for fluid flow into housing bore 4, a passage for fluid flow out of housing bore 4 and a mounting for the pivot post with which the valve linkage within housing 1 is manually adjusted.

Control head 15 is completely disclosed by FIG. 1, FIG. 3 and FIG. 4. The passages drilled in the body of the head can both be seen in FIG. 3. Inlet passage 16 simply directs fluid into bore 4 which outlet passage 17 removes the fluid from bore 4 as valved by the embodiment of the invention.

The internal end of passage 17 has a seat surface 18 formed about it. This seat surface 18 is formed by counterboring passage 17. The sides 19 of this counterbore are tapered outwardly from seat surface 18 and capture the valve element of the embodiment of the invention as the valve is actuated to variably restrict the flow of fluid across seat surface 18 and out passage 17.

Seat surface 18, about passage opening 17, is aligned with elongated link 10 as link 10 protrudes from casing 6. Between seat surface 18 and the end of link 10 are arranged the valve element for seat surface 18 and the actuating linkage for that valve element. As link 10 moves toward seat surface 18, the valve element is unseated from seat surface 18 by the unique arrangement of the linkage between link 10 and the valve element. Further, the point in the movement of link 10 at which the valve element is moved from full engagement with seat surface 18 is manually established. The mechanism with which these functions are brought about embodies the present invention.

Valve elements

The valve element 25, in elevation, resembles a collar button. The element has a flat surface 26 which rests on seat surface 18 about the opening of conduit 17. From the middle of the round, flat base 27 on which seat surface is located, a protuberance 29 extends away from the valve surface 26 and seat surface 18.

FIG. 1 shows collar button valve element 25 in position to close the opening of passage 17 through seat surface 18. In this position, the axis of element 25, passage 17 and link 10 are aligned. To open the passage 17, valve element 25 is tilted up on the circular edge of surface 26. To tilt the valve element 25 up on the circular edge, a force is applied to protuberance 28 in a direction transverse the axis of element 25, passage 17 and link 10.

Note is made of the fact that valve element 25 is symmetrical about its axis. The element can be readily turned out on a lathe or screw machine. The element can be rotated to any position about its axis. As long as the flat base 26 is held against seat surface 18, a transverse force can be applied to tip the round base 27 up on edge from any point on the edge. The edge is held captive by the slipping sides 19 of the counterbore of passage 17. The valve 25 is maintained in a consistent relationship to its seat and actuator, regardless of how it may rotate under vibration or other force applied to housing 1.

Floating link

Collar button valve 25 is actuated—a transverse force is applied—by a link member extending from link 10 to protuberance 28. FIG. 1 shows this actuating link 30 axially aligned between link 10 and valve 25. The elongated form of link 30 is held in operative engagement with the end of link 10 by a spring 31. While moving along the axis of link 10 to keep in operative engagement with link 10, link 30 moves relative to valve 25 as valve 25 is held on seat surface 18. Therefore, link 30 is referred to as the floating link of the actuating linkage for valve 25.

Floating link 30 is pivoted about a point, or series of points, spaced a transverse distance from the axis of valve 25 and link 10. Link 10, moving along its axis under the influence of temperature, causes link 30 to pivot and swing the end operatively engaged with valve protuberance 28 and apply the force needed to tilt valve 25.

Valve 25 and floating link 30 are of uniform shape about their axis. Both these parts can be turned on a lathe or produced on a screw machine. Also, floating link 30 can rotate to any position and remain in operative relation to link 10, valve 25 or its pivot structure. Despite the somewhat odd impression given to the eye, this link 30 is simple in operation, easily manufactured, readily assembled and not subject to malfunctioning when jarred or vibrated.

Pivot structure

A structure about which floating link 30 pivots is provided by post 32. Post 32 is mounted on control head 15, extending into bore 4 to contact flating link 30 as a pivot. Specifically, end surface 33 of post 32 is presented to surface 34 of floating link 30. As link 10 moves toward valve 25, these two surfaces engage at a position located a finite, transverse distance from the axis of link 10. Floating link 30 pivots, the end of actuating valve 25 swinging in an arc, carrying protuberance 28 in a direction transverse the axis to lift valve surface 26 from seat surface 18 an amount representative of the degree of temperature to which casing 6 is exposed.

Pivot post 32 is threadedly engaged through control head 15. Knob 35 enables the position of surface 33 to be adjusted along a path parallel to the axis of link 10 to provide the pivot for floating link 30 as desired.

Operation

FIG. 2 shows how the parts embodying the invention appear as link 10 is moved into bore 4, pivoting link 30 into a degree of misalignment with the axis of link 10. Valve surface 26 is lifted from seat surface 18, against the force of spring 31 and the force generated by the fluid pressure within bore 4. Fluid flows from the axial bore 4, out conduit 17 and to whatever device utilizes the fluid to increase the degree of heat to which casing 6 is exposed.

As the temperature condition increases, link 10 is carried back, out of bore 4. Floating link 30 is carried toward the FIG. 1 position to close the valve 25 over the entrance to conduit 17. The fluid is throttled and the temperature condition thereby adjusted.

The set point, or temperature value desired, is established by the position of the pivot point provided by pivot post 32. This value can be set by hand, simply turning knob 35 and thereby adjusting the post 32 in bore 4.

Both the structure embodying the invention and its function have been generalized deliberately, thus far, to express certain aspects of the invention in their broadest concepts. The valve element 25 can be appreciated as rotated about its axis, yet adapted to be actuated from its seat with uniform effectiveness by the linkage. The linkage is characterized by floating link 40. Link 30 is initially aligned axially with the valve element 25; the two are misaligned by movement of link 30. Link 30 moves by pivoting around a series of points which are positioned parallel to the axis of the floating link and valve element in their initial alignment. The specific forms which may be given the valve element and floating link have been developed to some extent; they will be developed further. Also, the nature of the connections between the parts will be discussed. In all of the specific forms of these structural members disclosed, and other forms not disclosed, my invention is found as set forth in my claims.

STRUCTURAL REVIEW AND AUXILIARY FEATURES

Temperature compensation

Link 10, between rod 9 and floating link 30, is formed and coordinated with the overall combination to carry out a unique function. It is a general desire that variations of ambient temperature not cause the output of the controller to change. Specifically, valve 25 should not move as the temperature of housing 1 changes.

The active, primary element, of the controller is a portion of case 6 which is exposed directly to the temperature condition sensed. But a length of case 6 extends out of the temperature condition to attach to housing 1. The active length of casing 6 can be considered that length commensurate with rod 9; this is the effective length of casing 6 exposed directly to the temperature condition within the vessel. As this active length varies with temperature, attached rod 9 and link 10 are moved along their axis to actuate valve 25. But what of the ambient temperature effect on the elongation of housing 1 along this same axis?

My approach to this problem is novel. I do nothing directly about the axial dimension change of housing 1. Seat surface 18 moves with the axial expansion and contraction of housing 1 on which the seat surface is mounted. What I do is establish a length for rod 9 which will keep it exposed only to the controlled temperature condition.

Obviously, with link 10 being the connection between the active length of casing 6 and valve 25, movement of housing and link together under the influence of ambient temperature will not change the relative position of valve 25 and seat 18 to each other. How do we insure housing 1 and link 10 will move together?

My solution to this problem is to make housing 1 and link 10 of materials having substantially the same coefficient of expansion. Having a common denominator of response to temperature variations, these parts move together. Extending link 10 down into the temperature condition sensed, to make connection with rod 9, insures that those portions of housing 1 and link 10 which are exposed to the common ambient temperature will move together to give the stability desired to valve 25 and seat 18. This arrangement leaves only the length of casing 6, which parallels rod 9, exposed to the controlled, and sensed, temperature condition. The active length of casing 6 is then the sole element of the control unit responsive to the controlled temperature condition.

Overtravel protection

There are applications for the control unit which have a range well above ambient, or some temperature to which the unit will be exposed. When exposed to such temperature, well below its normal range, the unit will having casing 6 shortened until floating link 30 has actuated valve 25 to its maximum open position. Casing 6 may continue to contract in length, jamming the linkage together with a force which will stress and distort the parts. I have provided a connection between end plug 8 and rod 9 which limits the degree of this stress on the linkage.

The stress-relieving connection comprises a spring 40 between rod 9 and end plug 8. Spring 40 exerts its force to separate rod 9 and plug 8 to the limit of stop 41. Then for all normal, relative movements of rod 9 and case 6, spring 40 and stop 41 causes rod 9 and case 6 to move together. Beyond a predetermined minimum length for case 6, spring 40 is overcome and rod 9 moves toward plug 8 to limit the stress on the linkage to valve 25.

Spring 40 is attached to rod 9 by a pin 42 and washer 43. Spring 40 and pin 42 capture washer 43 between them and the surface of washer 43 gives a solid, fixed abutment for the one end of spring 40.

A slotted collar 44 is fixed to end plug 8, pin 41 riding in slots 45 of collar 44. Spring 40, bearing against washer 43 by one end, bears against collar 44 by the other end, maintaining pin 41 at the one end of slot 45 until the overload compresses spring 40 and moves pin 41 along the slot 45.

It is to be understood that the stress on the linkage does not always come from the sensed temperature lowering to a value below the normal range. The low temperature could be ambient. If desired to control a temperature well above ambient, the position of post 32 can be established to properly place the pivot for floating link 30 at the set point value. This positioning will stress the valve linkage until spring 40 is compressed. The linkage stress is thereby relieved and when the set point temperature is reached spring 40 will have pin 41 against its end of slot 45 with case 6, rod 9 and link 10 moving the valve linkage as a unit.

Floating link 30

Link 10 is a simple, straight-forward, extension of rod 9. These two elements are threaded together at a location well within the temperature condition sensed to give the compensation for ambient variations as previously discussed. Link 10 has a fairly free fit in case 6 so the change in length of case 6 will move link 6 easily and without friction on the bore walls of case 6.

The end of link 10 protruding into the bore 4 has a protuberance 50 axially aligned on its end. This protuberance 50 is the specific contact member for floating link 30. This protuberance 50 must be appreciated as the single, definite pivot point for floating link 30. All other connections with floating link 30 must be designed with the fixed nature of the pivot taken into consideration.

Protuberance 50 extends into a depression 51 on the end of link 30. Depression 51 is axially aligned on the end of link 30. Spring 31 keeps protuberance 50 seated in depression 51 as link 30 swings about this pivot to tilt valve 25 from its seat.

Force is applied to link 30 to pivot link 30 about the fixed pivot by the relative movement of link 10 and surface 33 on pivot post 32. Specifically, surface 34 is brought into contact with surface 33 and the pivot provided by surface 33 then moves generally parallel to the pivot of 50–51. With pivot 50–51 fixed, the surfaces 33 and 34 must slide relative to each other as link 30 pivots. The contact of these surfaces may be made a rocking type of contact; then the pivot can be described as a series of points located transverse the axis of control housing 1.

Spring 31 then fits about the elongated portion of link 30 and bears against shelf 52 to hold link 30 yieldingly into engagement with link 10. The other end of link 30 connects with the protuberance 28 of valve 25 to tilt valve 25.

Protuberance 28 of valve 25 is given a spherical shape and placed within a cylindrical, axially aligned hole in the end of link 30 for actuation. Spherical protuberance 28 of collar button valve 25 has a close, but freely sliding fit in hole 53. As link 30 and valve 25 are misaligned, the walls of hole 53 bear upon the spherical protuberance 28 of valve 25 and tilt surface 26 away from surface 18.

The connection between valve 25 and link 30 permits great freedom of relative movement in all directions other than the transverse direction along which link 30 applies force to spherical protuberance 28. Ball 28 may slide up, along hole 53 as required. Valve 25 may rotate, as may link 30 itself. All this movement of the linkage components may occur without altering the basic, accurate actuation of valve 25 by link 30 in accordance with the change in the temperature condition sensed.

Spring 31

The basic purpose of spring 31 is to keep link 30 in contact with link 10. This is a particularly vital function in assembly of the linkage and before fluid pressure is placed in housing 1.

After fluid pressure is connected to passage 16 in head 15, the force of this pressure on valve 25 will urge valve 25 closed. This force will tend to align valve 25 with the axis of housing 1 and exert a realigning force on link 30. This combination of forces will tend to keep floating link 30 in position, between the three connections it has with link 10, surface 33 and valve 25.

Specifically, spring 31 is arranged between valve 25 and shelf 52 on link 30. Therefore, the force of spring 31 is simultaneously applied to seat valve 25 and keep link 30 in position. Other rearrangements of spring forces are possible to carry out the function of the invention.

Pivot post 32

The pivot provided between surface 33 and surface 34 has been discussed in form. Regardless of the precise nature of engagement between these two surfaces, their contact as a pivot in a general sense is established by the axial position given to post 32 in control head 15.

Post 32 is positioned manually by rotating the post in its threaded engagement with control head 15. This threaded engagement is indicated at 60. A knob 35 is threaded to the external end of post 32 and fixed in position with set screw 61. An annular groove 62 is formed on the underside of cap 35. A stop post 63 is fixed to the outer surface of head 15 to extend up into annular groove 62. A screw member 64 is then mounted on cap 35 to extend down into annular groove 62. Post 63 and screw 64 will engage each other as knob 35 is rotated and limit rotation of knob 35-post 32 to one revolution. The threaded engagement 60, together with the one-revolution limitation of knob 35 should give the flexibility to establish a satisfactory vertical range of movement for surface 33.

FIGS. 3 and 4 disclose how a scale 65 can be placed on knob 35 and cooperated with an index 66. Thus, a reference position will be established for adjustment of surface 33.

*Alternate forms of linkage*

Figure 7:
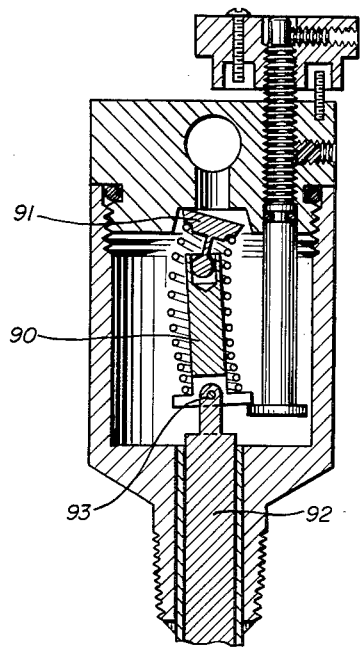
FIG. 7 illustrates still another form of linkage.
Figure 6:
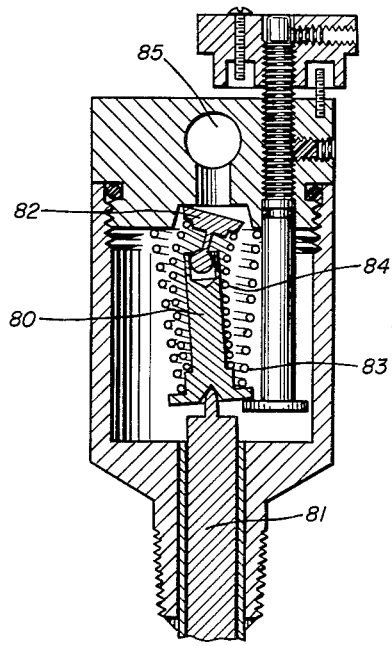
FIG. 6 is similar to FIG. 5 but illustrating another form of linkage.

FIGS. 5-7 show housings and control heads similar to the housing and control heads of the preceding drawings. Also, a pivot post is shown in each of these figures, quite similar to pivot post 32 of the preceding drawings. The purpose of FIGS. 5-7 is to illustrate some variations in form of the linkage embodying the present invention.

FIG. 5 discloses a floating link 70 which may be compared with floating link 30 of the preceding drawings. Also, valve element 71 is to be compared with valve element 25. Link 72 stands comparison with link 10.

Attention is directed to the variations in connection between 70-72 and 30, 25, 10 of the preceding drawings.

Floating link 70 is formed with a protuberance 73 fitting into a depression 74 in the end of link 72. Further, a spherical protuberance 75 is formed on the other end of link 70 to fit into hole 76 of valve 71. This "reversal" of parts does not prevent the linkage of FIG. 5 from embodying the inventive concept of the foregoing disclosure.

FIG. 6 illustrates a floating link 80, a link 81 and a valve element 82 quite similar to FIGS. 1-4. However, the spring system between link 80 and valve 82 is different from the simple spring 31 of the preceding drawings. Two separate springs are established to function between the linkage members of FIG. 6. Spring 83 bears on the underside of the control housing to floating link 80 in order to keep floating link 80 and link 81 in contact. This function of spring 83 is comparable to the function of spring 31 discussed heretofore.

The concept advanced by the spring system of FIG. 6 is that a spring 84 can be established between link 80 and valve 82 to urge valve 82 to close against a fluid pressure connected to the housing through passage 85. Spring 84 will have to be established in strength great enough to overcome the normal range of fluid pressure from conduit 85. Further, almost incidentally, it is to be observed that the direction from which link 80 approaches the pivot surface on the pivot post is opposite from that disclosed in FIGS. 1 and 2.

FIG. 7 discloses a floating link member 90 similar to link 80. Also, valve 91 is similar to valve 82. However, link 90 is attached to link 92 by a fixed pivot at 93. A pin is placed in holes which are aligned at this position in both link 92 and link 90.

In this arrangement in FIG. 7, it is expected that link 90 will be brought against the surface of the pivot post and floating link 90 will have its axis thereby misaligned with both valve 91 and link 92 to actuate the valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A valve and actuating linkage including:
   means providing a seat opening for the passage of fluid therethrough,
   a valve element having,
      (a) a round flat base fitting over the seat opening and adapted to be tilted about any point on its round edge in function to vary the restriction of the seat opening,
      (b) and a protuberance extending from the middle of the base and with an axis at right angles to the plane of the base;
   a link member axially aligned with the protuberance and with an axial hole journalled over the protuberance and adapted to move axially and pivot to axially misalign with the valve element to exert a transverse force on the protuberance with the wall of the hole to tilt the base about a point on its round edge to move the valve element from its fully seated position over the seat opening to a position which will restrict the seat opening,
   and a base member adjustable along a line parallel with the valve element and link member in providing a pivot point for the link member which varies the position of the pivot point about which the link member is misaligned with the valve element protuberance.

2. A valve adapted to be responsive to a variable including:
   a link member of generally elongated form about a straight line as an axis with,
      (a) a depression formed in the surface of one end of the link at which a contact object positioned over a range moves the link member about a pivot spaced a finite transverse distance from the depression,
      (b) a pivot point about which the link member is pivoted by the contact object to pivot the axis of the elongated link member about the point,
      (c) and a hole in the other end of the link with cylindrical sides to act as an actuating contact surface;
   a base member adjustable along a line parallel to the axis of the link member to provide the pivot point for the link member;
   means providing a seat opening for the passage of fluid therethrough,
   and a valve element of turned form about an axis initially aligned with the axis of the link member and with a flat restricting surface extended normal the axis of the link member to engage the seat opening and a protuberance extending into the hole of the link member to be actuated by the walls of the hole as the link is pivoted by the variably positioned contact element after axial movement to engage the pivot point on the base member and tilt the restricting surface away from the seat to vary the restriction to fluid flowing through the seat opening.

3. A valve and actuating linkage for the valve, including:
   a link member of elongated and turned form about a straight line as an axis, having,
      (a) an axially located depression in a first end for contacting a movable object,
      (b) an axially oriented cylindrical hole in the second end for receiving and actuating a valve member, (c) and a portion projecting a finite distance transverse the axis for engaging a pivot on a line parallel the axis of the link member about which the link member is rotated following axial movement of the link to engage the pivot point;

a spring about the link member and axially oriented with the link member and urging the depression in the first end of the link member into contact with a movable object;

a base member adjustable along a line parallel to the axis of the link member to provide the pivot point for the link member, means providing a seat opening for the passage of fluid therethrough, and a valve member of turned form having a circular edge oriented about its seat opening and axially aligned with the link member to extend a protuberance into the cylindrical hole of the second end of the link member, whereby misalignment of the link member and valve member by rotation of the valve member about the pivot against the aligning spring tilts the valve at a point on the circular edge from its fully seated position over the seat opening to positions which will vary the opening of the seat opening by the valve member.

4. A controller, including,
a housing with an axial bore,
an axial opening in one end of the axial bore,
a link sliding in the axial opening and adapted to be operated by a temperature responsive means,
a head member on the other end of the axial bore of the housing,
a fluid passage in the head member with an opening into the axial bore in the axial alignment with the axial opening in the one end of the axial bore,
a valve member of turned form arranged for seating on the opening of the first fluid passage in the head member so as to be tilted from any point on its edge in controlling the fluid flowing through the opening,
a link of elongated and turned form arranged in initial axial alignment between the link sliding in the axial opening of the housing and the valve member and having an extension transverse the axis of alignment and adapted for axial movement by the sliding housing link sliding in the axial opening of the housing, and a pivot post mounted on the head member so as to extend into the axial bore and engage the transverse extension of the elongated link and form a pivot point which the link sliding in the axial opening of the housing engages after axial movement and misaligns the elongated link and tilts the valve member.

5. The controller of claim 4 in which the pivot post is mounted on the head member by threaded engagement and is manually adjustable from external the housing.

6. The controller of claim 4 in which the link of elongated and turned form connects with the link sliding in the axial opening of the housing by a protuberance on one member fitting in a depression of the other and connects with the valve member by a protuberance on one member fitting into a cylindrical bore of the other.

7. The controller of claim 4 in which a spring is arranged to maintain the link of elongated and turned form in contact with the link sliding in the axial opening of the housing.

8. The controller of claim 4 including a spring member arranged to urge the link of elongated and turned form into contact with the link sliding in the axial opening of the housing.

9. The controller of claim 4 including a spring member arranged to urge the valve member into seating on the opening of the first fluid passage.

10. The controller of claim 4 including a spring member arranged to simultaneously urge the link of elongated and turned form into contact with the link sliding in the axial opening of the housing and the valve member into seating on the opening of the first fluid passage.

References Cited by the Examiner

UNITED STATES PATENTS

| | | | |
|---|---|---|---|
| 934,116 | 9/09 | Weld | 236—87 |
| 1,681,966 | 8/28 | Zeidler | 251—280 |
| 2,210,446 | 8/40 | Cerny | 236—102 |
| 2,463,921 | 3/49 | Titcomb | 236—102 X |
| 2,574,969 | 11/51 | Heidloff | 251—228 X |

FOREIGN PATENTS 440,440   5/12   France.

EDWARD J. MICHAEL, *Primary Examiner.*
ALDEN D. STEWART, *Examiner.*